6460X
Richmond & Caswell, Jr.
Making Hoes and Shovels.
Patented Apr. 7, 1831.
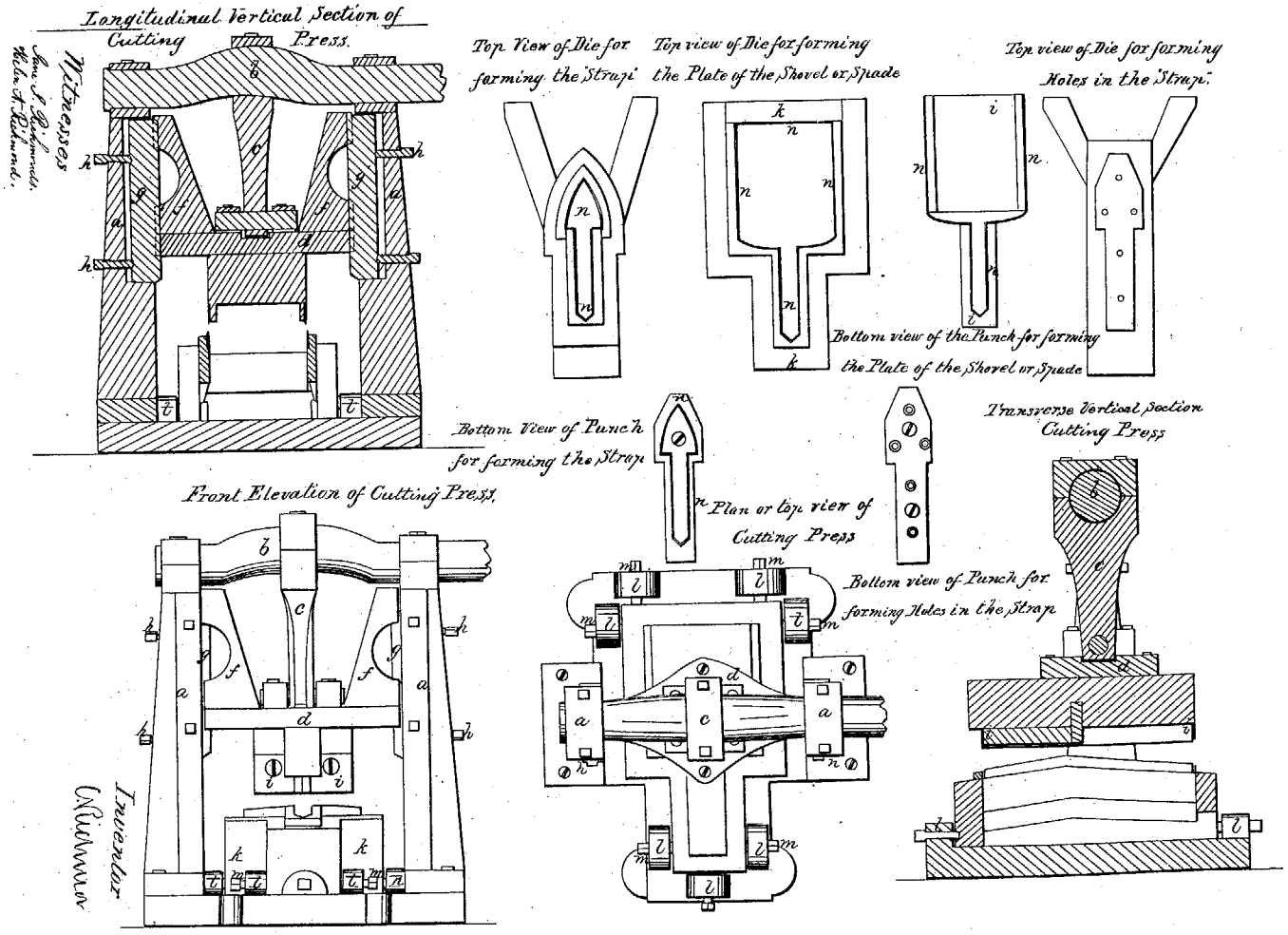
Witnesses
Jane S. Richmond.
Helen A. Richmond.
Inventor
C. Richmond
N. PETERS, PHOTO-LITHOGRAPHER, WASHINGTON, D. C.

272 6460 X April 7, 1831 250 x Charles Richmond & Samuel Caswell Junr. —
Letters Patent, dated April 7. 1831. —

---

The Schedule referred to in the Letters Patent and making part of the same containing a description in the words of the said Charles Richmond & Samuel Caswell Junior themselves of their improvement in the mode of manufacturing spades and shovels by means of machinery.

---

To all whom it may Concern: Be it known that we Charles Richmond and Saml Caswell Junr have invented an improved mode of manufacturing spades and shovels by machinery; whereby much labor is saved and the articles manufactured are made with greater truth and uniformity than by the modes hitherto pursued; and that the following is a full and exact description of our said invention.

The principal machinery which we employ is such as is well known to machinists, and to this therefore we make no claim; as we have merely so modified it, in size and form, as to adapt it to the purpose to which we apply it.

That our mode of procedure may be perfectly understood, we have deposited in the Patent Office of the United States, drawings of the machinery, as modified and applied by us; and also a model of the same corresponding with the [illegible]

This machinery consists first of a Cutting Press by which the plate prepared for making a spade or shovel, is cut out at one operation; and by another operation is punched, to receive the rivets necessary to attach the back strap and [illegible] to the plates.

The second part of the machinery is a Stamping apparatus, usually called a drop. This has a bed piece, or anvil which is fixed below the sliding drop, and [illegible]

[illegible]

6460 X one part of the die by which the spade, or shovel is to be shaped; the sliding part of the drop is made to correspond to this and forms the upper part of the die.

To make a spade, or shovel we take a bar of Sweedish, or other iron and upon the side of this we usually weld a piece of steel.

The bar is then rolled out to the size necessary for forming the spade or shovel. It is then placed under the cutting press, and is cut out at one operation.

The same press receives dies to cut the strap, and also to punch the requisite holes, each of which is also effected at one operation.

The Plates, so cut, are then placed in the drop, and by a single blow, receive the form required.

The improvement which we have made in the manufacture of Spades and Shovels and for which we claim a patent, is the use of Cutters and dies, used in the cutting press and drop; by which the plate of which the spade, or shovel is to be made is first cut out and afterwards stamped into the proper shape each by a single operation.

Witnesses | Chs. Richmond
Geo. B. Atwood | Samuel Caswell Jr
D. G. W. Cobb (512 words)

Received & Recorded anew February 24th 1842 and Exd [illegible]

Drawing